(No Model.)
G. N. CLEMSON.
HACK SAW.
No. 400,057. Patented Mar. 26, 1889.
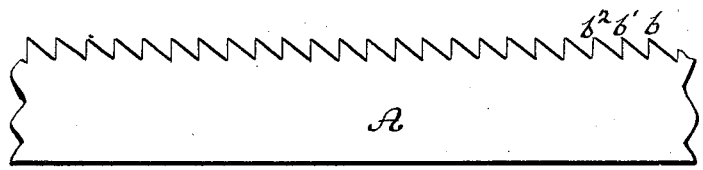
Fig. 1.
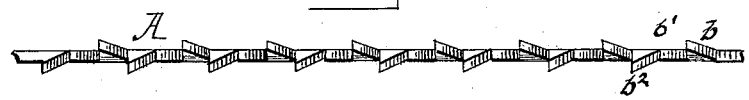
Fig. 2.
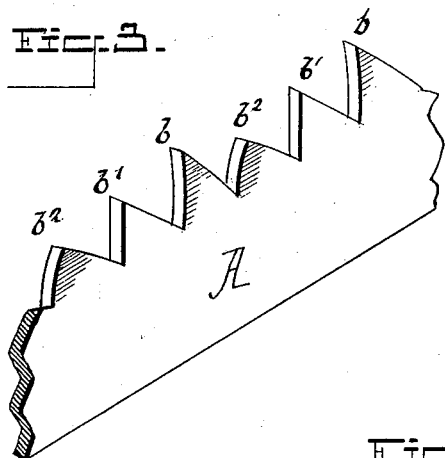
Fig. 3.
Fig. 4.
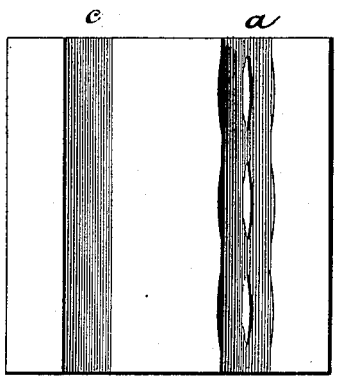
WITNESSES:
O. D. Mott
C. Sedgwick
INVENTOR:
G. N. Clemson
BY Munn & Co.
ATTORNEYS.

UNITED STATES PATENT OFFICE.

GEORGE N. CLEMSON, OF MIDDLETOWN, NEW YORK.

HACK-SAW.

SPECIFICATION forming part of Letters Patent No. 400,057, dated March 26, 1889.

Application filed June 15, 1888. Serial No. 277,214. (No model.)

*To all whom it may concern:*

Be it known that I, GEORGE N. CLEMSON, of Middletown, in the county of Orange and State of New York, have invented a new and Improved Hack-Saw, of which the following is a specification, reference being had to the annexed drawings forming a part thereof, in which—

Figure 1 is a side elevation of my improved hack-saw. Fig. 2 is a view of the cutting-edge. Fig. 3 is a perspective view, and Fig. 4 is a face view, of a piece of metal having formed in it two saw-kerfs, one made by an ordinary saw, the other by a saw having my improvement.

Similar letters of reference indicate corresponding parts in all the views.

Hack-saws, as ordinarily made, are provided with teeth which are set alternately in opposite directions to give the saw clearance and to prevent it from pinching in the saw-kerf after the saw becomes worn.

In the manufacture of such saws it is desirable to make the set as wide as possible, to allow the teeth to wear for a long time before the saw begins to pinch. If the teeth are set wide enough to cut a kerf over twice the thickness of the body of the saw, there will be a space in the center of the saw-kerf where the saw will not cut as perfectly as in other places. The saw will vibrate laterally, producing a kerf like that shown at $a$ in Fig. 4. It will also be difficult to guide the saw so as to start it upon a given line.

The object of my invention is to avoid these imperfections and difficulties by providing a saw having every third tooth arranged in the same plane as the body of the saw, the remaining teeth being set in the usual way. A saw set in this manner can be set to cut a kerf three times as wide as the thickness of the saw before it will vibrate laterally, which insures perfect work and prolongs the usefulness of a saw.

The saw-blade A is provided with teeth $b$ $b'$ $b^2$, all of the same form and same height, but set in the following order: the teeth $b$ all set over upon one side of the plane of the saw-blade, the teeth $b^2$ being all set over upon the opposite side of the plane of the saw-blade, the teeth $b'$ having no set and lying in a continuation of the plane of the saw-blade. Arranged in this way the entire path of the edge of the saw is traversed by cutting-edges, so that the kerf is made smooth and straight, as shown at $c$ in Fig. 4. The cutting-edges of all the teeth are square in contradistinction to being beveled, so that the points of any three adjacent teeth will completely cover the width of the kerf, and thereby prevent the points of the teeth from being broken as the kerf deepens.

Having thus described my invention, I claim as new and desire to secure by Letters Patent—

As an improved article of manufacture, a hack-saw provided with the teeth $b$ $b'$ $b^2$, all of the same form and height and having their cutting-edges square, the teeth $b'$ lying in the plane of the blade and the teeth $b$ $b^2$ set in opposite directions, as set forth.

GEORGE N. CLEMSON.

Witnesses:
HENRY W. WIGGINS,
WILLIAM D. BROWN.